United States Patent Office 3,352,870
Patented Nov. 14, 1967

3,352,870
DI-(N-CYANOALKYLPIPERIDYL)ALKANES
Francis E. Cislak, William H. Rieger, and John H. Chapman, Indianapolis, Ind., assignors to Reilly Tar & Chemical Corporation, Indianapolis, Ind., a corporation of Indiana
No Drawing. Filed May 24, 1965, Ser. No. 458,485
5 Claims. (Cl. 260—293)

This invention relates to new compositions of matter. More particularly, it relates to new organic compounds, which compounds have the formula:

$$R_1, R_2 \text{—piperidyl—} C(R)(H) \text{—} (CH_2)_n \text{—} C(R)(H) \text{—piperidyl—} R_3, R_4$$
with N-$(CH_2)_x$-CN substituents wherein R, $R_1$, $R_2$, $R_3$, and $R_4$ represent hydrogen or lower alkyl, they may be alike or they may be different; $x$ is a small integer from 1 to 3; $n$ is a small integer from 0 to 4.

In general our new compounds may be prepared by the reaction of a halogenoalkyl nitrile with a di-piperidyl alkane in the presence of an alkali metal carbonate. Some of them may be prepared by the interaction of acrylonitrile with a di-piperidyl alkane.

The di-N-cyanoalkylpiperidyl alkanes of our invention are difunctional aliphatic nitriles. They have the chemical properties associated with aliphatic nitriles and are capable of entering into the same type of reactions as do other aliphatic nitriles, within the limitations imposed by the piperidine nucleus. They are normally solid and possess a low volatility. They are insoluble in water; they are soluble in common organic solvents, such as methanol, acetone, benzene. They are soluble in dilute mineral acids. A solution of about 5% of our di-(N-cyanoalkylpiperidyl) alkanes in high boiling coal tar bases is a useful inhibitor for the pickling of steel with sulfuric acid and in acidizing oil wells with hydrochloric acid.

Of the many reactions possible with our di-(N-cyanoalkylpiperidyl)alkanes, those of most commercial significance are the hydrolysis to di-carboxylic acids and the hydrogenation to diamines.

Heating our di-(N-cyanoalkylpiperidyl)alkanes with aqueous caustic converts the nitrile groups to carboxyl groups. The di-(N-carboxyalkylpiperidyl)alkanes are useful raw materials from which to make resins. They may be reacted with ethylene glycol to make polyester resins. These polyester resins are useful in fabricating fiber glass.

Catalytic hydrogenation of our di-(N-cyanoalkylpiperidyl)alkanes converts the cyano groups to methyleneamino groups. The resulting di-(N-aminoalkylpiperidyl)-alkanes are useful curing agents for epoxy resins. They are also useful in the preparation of polyamide type resins.

The manner of carrying out our invention is described in the following specific examples. These examples are given by way of illustration only and are not intended as a limitation of our invention.

*Example 1.—1,3-di-4-(N-beta-cyanoethylpiperidyl)propane*

$$\text{piperidyl-N-CH}_2\text{CH}_2\text{CN, 4-position linked by -CH}_2\text{CH}_2\text{CH}_2\text{- to another piperidyl-N-CH}_2\text{CH}_2\text{CN}$$

A suspension of 70 grams of 1,3-di-4-piperidylpropane in 800 cc. of water is placed into a two-liter flask equipped with a stirrer. While stirring the suspension, it is heated to about 40° C. To the warm stirred suspension there is added slowly 40 grams of acrylonitrile. As the acrylonitrile is added, a reaction occurs forming 1,3-di-4-(N-beta-cyanoethylpiperidyl)propane; the reaction mixture becomes a homogeneous phase. By the time all of the acrylonitrile has been added, the reaction product, 1,3-di-4-(N-beta-cyanoethylpiperidyl)propane begins to crystallize out. The resulting slurry is stirred for an additional hour after all the acrylonitrile has been added. Then the mixture is cooled to about 25° C. and the 1,3-di-4-(N-beta-cyanoethylpiperidyl)propane is separated by filtration; it is washed with water and then dried.

The 1,3-di-4-(N-beta-cyanoethylpiperidyl)propane has a freezing point of about 70° C. It is insoluble in water; it is soluble in dilute aqueous acid solutions. It is soluble in the common organic solvents such as methanol, acetone, benzene, and the like.

*Example 2.—1,3-di-2-(N-beta-cyanoethylpiperidyl)propane*

$$\text{2-piperidyl-N-CH}_2\text{CH}_2\text{CN, linked at 2-position by -CH}_2\text{CH}_2\text{CH}_2\text{- to another 2-piperidyl-N-CH}_2\text{CH}_2\text{CN}$$

The procedure of Example 1 is repeated with the exception that 1,3-di-2-piperidylpropane is used in place of the 1,3-di-4-piperidylpropane.

*Example 3.—1,4-di-4-(N-beta-cyanoethylpiperidyl)butane*

$$\text{4-piperidyl-N-CH}_2\text{CH}_2\text{CN, linked at 4-position by -(CH}_2)_4\text{- to another 4-piperidyl-N-CH}_2\text{CH}_2\text{CN}$$

The procedure of Example 1 is repeated with the exception that 75 grams of 1,4-di-4-piperidylbutane is used in place of the 70 grams of 1,3-di-4-piperidylpropane.

*Example 4.—1-3-(N-beta-cyanoethylpiperidyl)-3-4-(N-beta-cyanoethylpiperidyl)propane*

$$\text{3-piperidyl-N-CH}_2\text{CH}_2\text{CN linked by -CH}_2\text{CH}_2\text{CH}_2\text{- to 4-piperidyl-N-CH}_2\text{CH}_2\text{CN}$$

The procedure of Example 1 is repeated with the exception that 1-3-piperidyl, 3-4-piperidylpropane is used in place of the 1,3-di-4-piperidylpropane.

*Example 5.—1,3-di-4-(N-gamma-cyanopropylpiperidyl)propane*

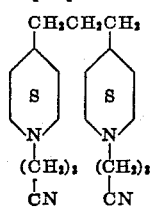

A mixture of 70 grams of 1,3-di-4-piperidylpropane, 800 cc. of water, 110 grams of 3-bromo-butyronitrile, and 150 grams of sodium carbonate are placed into a two liter flask equipped with a stirrer and a reflux condenser. The mixture is stirred and heated at about 70° C. for from about four to eight hours. During the heating a reaction occurs whereby sodium bromide and 1,3-di-4-(N-gamma-cyanopropylpiperidyl)propane are formed. After the reaction period is over, the reaction mixture is cooled, and the 1,3-di-4-(N-gamma-cyanopropylpiperidyl)propane is separated by filtration.

*Example 6.—1-2-(N-beta-cyanoethyl-5-ethylpiperidyl)-3-4-(N-beta-cyanoethylpiperidyl)propane*

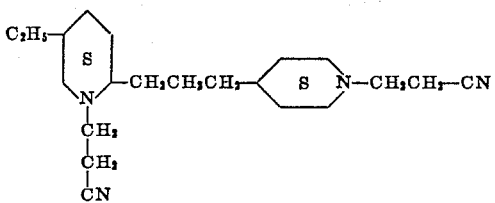

The procedure of Example 1 is repeated with the exception that 80 grams of 1-2-(5-ethylpiperidyl)-3-4-piperidylpropane is used in place of the 1,3-di-4-piperidylpropane.

*Example 7.—1,5-di-4-(N-beta-cyanoethylpiperidyl)pentane*

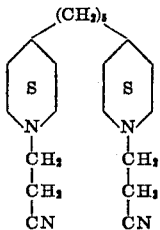

The procedure of Example 1 is repeated with the exception that 80 grams of 1,5-di-4-piperidylpentane is used in place of the 70 grams of 1,3-di-4-piperidylpropane.

*Example 8.—1-2-(N-beta-cyanoethylpiperidyl)-3-4-(N-beta-cyanoethylpiperidyl)propane*

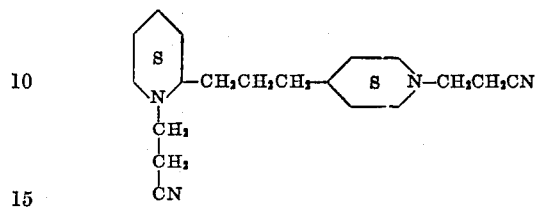

The procedure of Example 1 is repeated with the exception that 1-2-piperidyl - 3 - 4 - piperidylpropane is used in place of the 1,3-di-4-piperidylpropane.

We claim as our invention:

1. Di-(N-cyanoalkylpiperidyl)alkanes whose formula is:

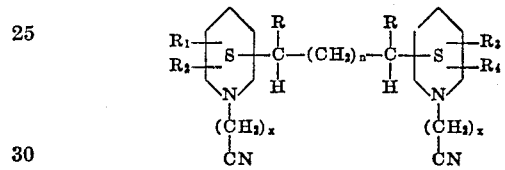

wherein R, $R_1$, $R_2$, $R_3$, and $R_4$ are selected from the class consisting of hydrogen and lower alkyl; $x$ is a small integer from 1 to 3; $n$ is a small integer from 1 to 4.

2. 1,3-di-4-(N-beta-cyanoethylpiperidyl)propane.
3. 1,3-di-2-(N-beta-cyanoethylpiperidyl)propane.
4. 1,4-di-4-(N-beta-cyanoethylpiperidyl)butane.
5. 1-2 - (N-beta-canoethylpiperidyl) - 3 - 4-(N-cyanoethylpiperidyl)propane.

References Cited

UNITED STATES PATENTS 3,101,340   8/1963   Rorig _____ 260—294.7
3,310,555   3/1967   Peason _____ 260—294.7

WALTER A. MODANCE, *Primary Examiner.*

AVROM D. SPEVACK, *Assistant Examiner.*